United States Patent [19]

Minera

[11] 3,978,237

[45] Aug. 31, 1976

[54] METHOD OF HULLING BERRIES WITH OPPOSITELY ROTATING BRUSHES CONTAINING STIFF AND RESILIENT BRISTLES

[76] Inventor: Salvador A. Minera, 1921 Taraval, San Francisco, Calif. 94116

[22] Filed: Jan. 16, 1975

[21] Appl. No.: 541,560

Related U.S. Application Data

[62] Division of Ser. No. 371,829, June 20, 1973, Pat. No. 3,869,977.

[52] U.S. Cl. .................................. 426/481; 426/484
[51] Int. Cl.² .................. A23L 1/212; A23N 15/02
[58] Field of Search .................. 426/484, 518, 481; 99/537, 567, 635, 636, 637, 639, 640, 641; 83/431

[56] References Cited
UNITED STATES PATENTS

| | | | |
|---|---|---|---|
| 1,234,698 | 7/1917 | Foote | 99/641 |
| 2,323,668 | 7/1943 | Morgan | 83/431 |
| 2,383,268 | 8/1945 | Morgan | 99/640 |
| 2,527,182 | 10/1950 | Gaddic | 99/640 |
| 3,103,240 | 9/1963 | Minera | 99/640 |
| 3,104,691 | 9/1963 | Minera | 99/640 |
| 3,176,739 | 4/1965 | Minera | 99/640 |

FOREIGN PATENTS OR APPLICATIONS

| 1,277,230 | 10/1961 | France | 99/640 |
|---|---|---|---|

Primary Examiner—S. Leon Bashore
Assistant Examiner—M. Steve Alvo
Attorney, Agent, or Firm—Townsend and Townsend

[57] ABSTRACT

A method of hulling berries in which the unhulled berries are supported on a pair of oppositely rotating brushes with their adjacent sides moving downwardly and with the bristles in partially lapping relation at their adjacent sides.

The bristles are sufficiently stiff and resilient to pull sepals drawn between them downwardly from a berry supported on the pair of brushes, without tearing them, and to partially enter each berry at the stem end of the calyx (hull) for passing over the enlargement on the calyx at said end to quickly push the enlargement, with the sepals attached, out of the berry.

In operation, upon one of the sepals of a berry supported on the pair of brushes being engaged between bristles, the berry will be held against movement longitudinally of the brushes while the remaining sepals are progressively gathered between the brushes, and after being gathered the brushes slightly enter the berry to move across said enlargement and remove it, including the gathered sepals, from the berry.

5 Claims, 18 Drawing Figures

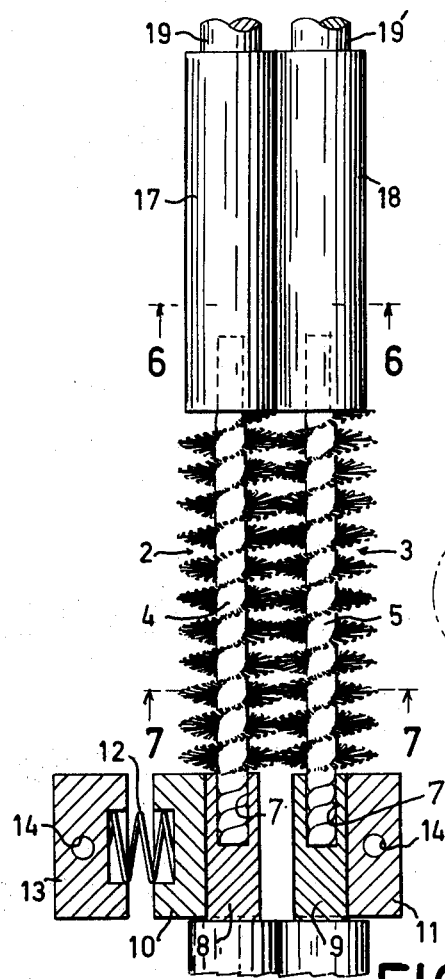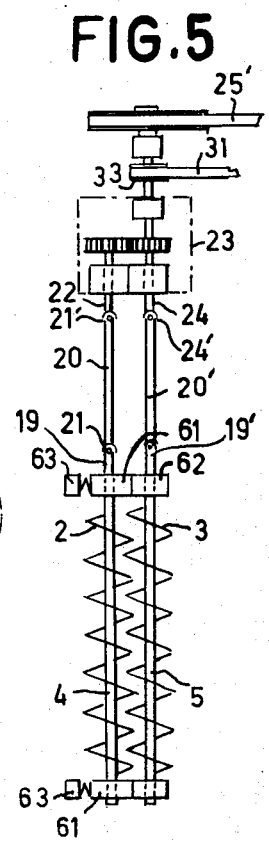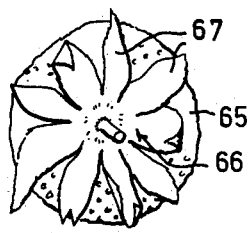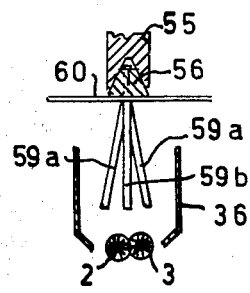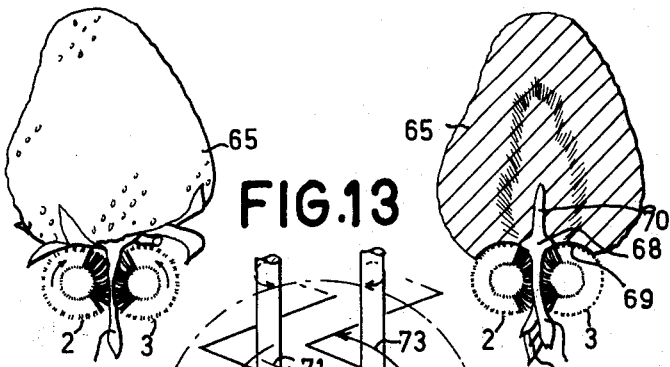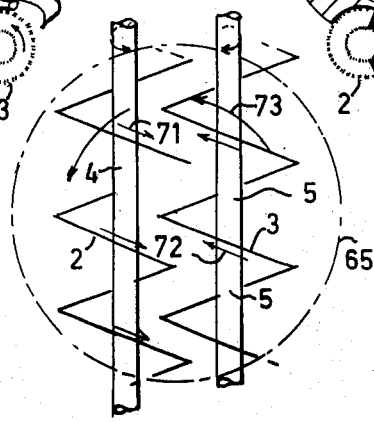

3,978,237

METHOD OF HULLING BERRIES WITH OPPOSITELY ROTATING BRUSHES CONTAINING STIFF AND RESILIENT BRISTLES

CROSS-REFERENCE TO RELATED APPLICATION

This is a divisional application of my co-pending application, Ser. No. 371,829, filed June 20, 1973 now U.S. Pat. No. 3,869,977, for "Huller For Berries".

SUMMARY

Heretofore, attempts to remove the calyxes, or hulls, from strawberries have usually involved the use of rubber rollers or the like. Others have attempted to cut off the stem ends of the berries where the latter are for freezing or canning.

In strawberries the sepals of some varieties lie close against the stem end of each berry while in others some or all may curl away to different degrees. In any event, rubber rollers or rubber covered rollers, whether surface-ribbed or roughened, are incapable of grasping all of the sepals, or of collecting them for withdrawal of the calyx and its enlarged central portion or the portion extending into the berry. Sharp rigid needle-like projections on rollers lit the sepals and immediately lose their pulling force. It has also been found that sufficient pulling force exerted on one or several sepals to pull them from the berry, results in their being pulled from the enlargement at their inner ends, leaving the remainder of the hull on the berry.

In view of the above objections to the use of apparatus to hull the strawberries, the strawberries are now hulled manually, each operator having a device resembling a finger nail attached to one of his or her fingers and projecting therefrom, which device scoops out the hull at its base including varying amounts of the berries at their stem ends.

The manual handling of the berries is quite costly and is relatively slow. Also the waste in the amount of berries cut away is not uniform, and varies with the extent the hull covers each berry and the snugness with which the sepals engage the berry, and the sizes of the berries.

One of the objects of the present invention is the provision of a method for more quickly and uniformly hulling strawberries of varying sizes and contours than heretofore, and in which there is less waste and a cleaner and fuller removal of the hull and its enlarged base including the portion extending into each berry than heretofore, irrespective of the type of strawberry or the size.

DRAWINGS

FIG. 4 is an enlarged, fragmentary top plan view of a pair of rollers and hulling brushes on which the strawberries are supported for movement longitudinally of the rollers and brushes.

FIG. 5 is a semi-diagrammatic top plan view of the driving assembly for the rollers and brushes of FIG. 4, or for the brushes without the rollers, and showing a modification of the bearings to hold the brushes in minimum spaced relation when the brushes are used without the rollers.

FIG. 6 is a cross-sectional view at line 6—6 of FIG. 4.

FIG. 7 is an enlarged cross-sectional view at line 7—7 of FIG. 4 in which the bristles on the brushes are indicated in single lines and only at the intermeshing sides of the brushes.

FIG. 10 is a top plan view of a strawberry showing some of the sepals against the stem end of the berry and others curled away at their ends. FIG. 11 is a semi-diagrammatic view of the brushes of FIG. 4 engaging one of the sepals and pulling it between the brushes.

FIG. 12 is a cross-sectional view showing all of the sepals gathered between the bristles of the brushes with the latter in a position at the enlargement of the calyx just before the bristles will pass over the enlargement to push the calyx out of the berry.

FIG. 13 is a greatly enlarged diagrammatic top plan view of portions of the brushes of FIG. 4 showing the direction of rotation of the brushes and the outline of a strawberry supported on the brushes, and the movement of the berry after a sepal is caught between them.

FIG. 14 is a modification of the portion of the huller shown in FIGS. 8, 9.

DETAILED DESCRIPTION

Figure 1:
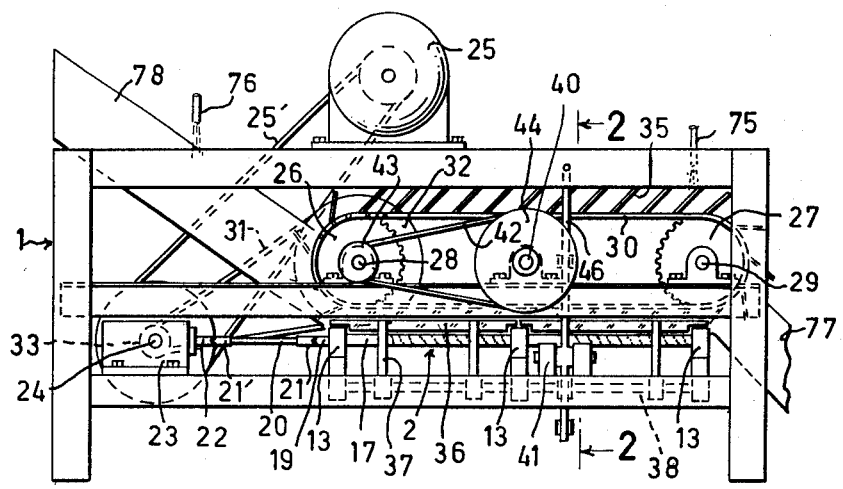
FIG. 1 is a simplified, side elevational view of the hulling machine.

In FIG. 1, a rigid frame generally designated 1 and parts thereof supports the various elements of the huller.

A pair of rotary, horizontally elongated brushes 2, 3 having central shafts 4, 5 (FIGS. 1, 5, 13) are positioned in side-by-side relation, which shafts comprise a pair of wires 6 twisted together (FIG. 7) with a row of adjoining relatively stiff resilient bristles positioned between them to provide a helical row of radially outwardly extending bristles of the same length. These bristles are preferably of plastic material, such as NYLON, for example. This type of brush, in itself, and manner of construction are old.

The brushes are preferably approximately 0.330 in. in diameter, with the maximum diameter of the shaft supporting them being approximately 0.150 in. and the diameter of each bristle is approximately 0.009 in. Relatively hard plastic, such as NYLON, has been found to be satisfactory, as to flexibility, resistance to bending, and recovery after bending. They do not cut the sepals, nor injure the berries moving thereover, and quickly gather and remove the gathered sepals from each berry.

The above dimensions have been found to be satisfactory, where the berries are ripe but not overripe, and variations may occur where the berries are relatively soft and for some varieties.

Said shafts 4, 5 are respectively secured at one of their ends in axially outwardly opening recesses 7 in one of the ends of cylindrical extensions 8, 9 (FIG. 4)

that provide for respectively rotatably supporting the shafts in bearings 10, 11. The bristles terminate at said extensions.

These bearings are of the type clearly shown and described in my U.S. Pat. No. 2,819,745. The bearing 10 is the present instance has a side opening recess facing bearing 11, in which the extension 8 is rotatably supported. This bearing is yieldably urged by a spring 12 toward bearing 11 said spring being between bearing 10 and a fixed element 13 secured on a rigid portion of frame 1.

The bearing 11 also has a side opening recess facing bearing 10 and is rigidly secured to a portion of the frame 1. Bolt holes 14 (FIG. 4) are provided for so securing the element 10 and bearing 11 to a portion of frame 1.

The ends of shafts 2, 3 opposite the extensions 8, 9 may be respectively secured in axially opening recesses, corresponding to recesses 7, in one of the ends of a pair of rollers 17, 18 that are respectively in axial alignment with brushes 2, 3.

These rollers may be axially elongated as seen in FIG. 4, and covered with relatively soft rubber (FIG. 6). Said extensions 8, 9 may be extensions of the central metal core of each roller but in instances where the rubber rollers may be deleted the extensions are independent of the rubber rollers and merely function as cylindrical supports for the ends of the brush shafts.

The same numbers are used in the different views for the same elements.

Three of the stationary or fixed elements 13 of each bearing structure 10–13 for the sets of rollers 17, 18 and brushes 2, 3 are shown in FIG. 1. The berries are received on the rollers at the left hand end of the machine.

The structure for driving rollers 17, 18 or a pair of brushes only would be the same. In FIG. 4, extensions 19, 19' are on the rollers 17, 18. In FIG. 5 extensions 19, 19' are on the ends of the shafts 4, 5 of a pair of brushes. Extensions 19, in either instance, are connected with a shaft 20 by a universal coupling 21 (FIGS. 1, 5). Shaft 20 is connected by a universal coupling 21' with a shaft 22. Shaft 22 is connected by intermeshing gears in a gear box 23 with a shaft 24. Universal coupling 24' connects shaft 24 with a shaft 20' that is connected by a universal joint with extension 19' (FIG. 4).

From the foregoing it is seen that the brushes 2 and rollers 17 may be yieldably moved toward and away from the brushes 3 and rollers 18 and the rollers 17, 18 when together limit the movement of the brushes 2, 3 toward each other so their bristles will be in only partial lapping relation (FIG. 7). The rollers 18 and brushes 3 will be fixed.

In FIG. 5 the bearings for the brushes perform the same function as rollers 17, 18 insofar as spacing the brushes of the pairs, inasmuch as the bearings for both shafts are in engagement.

The shaft 24 is connected with a motor 25 by a belt 25' extending over pulleys on shaft 24 and the motor shaft (FIGS. 1, 5).

Rollers 17, 18 may be short for spacing purpose, or they may be long, as seen in FIGS. 1, 4 according to the condition and character of the berries.

The shafts 4, 5 are rotated by motor 25 oppositely for downward movement of their adjacent sides, and the berries are preferably fed onto the brushes at the left end of the latter as seen in FIG. 1.

It should be noted that use of more than one pair of brushes is not essential to the method of operation, as will later appear, nor does the length of the brushes change the manner of operation. However, where the hulls are tight against the berries and the latter are quite irregular in contour, a pair of longer brushes or several pairs of aligned brushes, as seen in FIG. 1 will provide more time for the hulls to be caught for gathering and removal.

A single pair of vertical spaced sprocket wheels 26, 27 supported on shafts 28, 29 above the brushes in a vertical plane that bisects the space between the shafts of the brushes, support and endless chain 30 that may be driven by a belt 31 connecting a pulley 32 on shaft 28 with a pulley 33 on shaft 24 or a similar motor driven take-off shaft from gear box 23 (FIG. 1).

Equally spaced links on said chain carry spaced, quite flexible, elongated, finger-like elements or impellers 35 of rubber or the like that extend from the lower run of the chain to points adjacent but spaced above the pair of brushes 2, 3. The row of impellers 35 carried by the chain are in the same vertical plane as the chain but may incline in said plane rearwardly from the lower run relative to the direction of movement of the latter, which movement is from left to right as seen in FIG. 1.

The elements 35 function to move the berries on the brushes (normally by rolling them), toward the discharge end, but only the berries that are free to so move. Any berry that is being dehulled will not be moved. Instead, the impellers 35 will merely move past them to one side or the other. Very little force is required to move free berries whether hulled or not.

Extending longitudinally of the brushes and at opposite sides of the pair or pairs thereof are vertically disposed elongated side walls 36 between which the berries on the brushes or rollers are positioned in single file. These side walls may be rods, and they are supported on the upper ends of vertically extending arms 37. Arms 37, in turn, are secured supported at points intermediate their upper and lower ends on shafts 38 for simultaneous oscillation of their upper ends transversely of the lengths of the brushes (FIG. 2).

One means for so oscillating the walls 36 is by a rotating circular cam 39 (FIGS. 2, 3) centrally secured on a horizontal shaft 40 supported approximately midway between the receiving and discharge ends of the berry supporting brushes and rollers. Bearings 41 on the frame 1 support said shaft and the shaft and cam are driven by a belt 42 connecting a pulley 43 on shaft 28 with pulley 44 on shaft 40 (FIGS. 1, 2).

Figure 2:
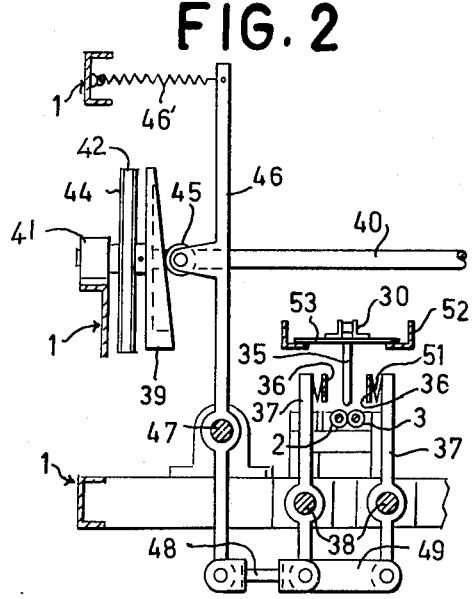
FIG. 2 is an enlarged, fragmentary view at line 2—2 of FIG. 1, and is semi-diagrammatic with respect to the brushes.
Figure 3:
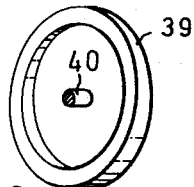
FIG. 3 is a perspective view of a cam shown in elevation in FIG. 2.

A cam follower 45 carried on a vertically extending arm 46 at a location intermediate its ends engages the cam face of the annular cam 39 (FIG. 2).

Spaced below the cam follower 45 is a shaft 47 on which arm 46 is supported for oscillation. A link 48 pivotally connects the arms 46 below the shaft 47 with a link 49 that is pivotally connected at its ends to the lower ends of arms 37. A spring 46 connects the upper end of arm 46 with a rigid portion of frame 1 to yieldably hold the follower 45 against the annularly extending lateral face of cam 39.

Upon rotation of cam 39 the walls 36 will move berries from one brush to the other, thus causing them to rotate oppositely about axes parallel with the axes of the brushes until at least one of the sepals is caught between the brushes. The walls 36 will not disturb a berry being hulled, and will yield if they engage a berry that is in the process of being hulled.

Frame strips 52 (FIG. 2) extending parallel with the brushes and rollers support the ends of oppositely outwardly projecting members 53 that are secured to the chain 30 at spaced intervals to support the lower run of the chains at a uniform distance above the brushes and in a vertical plane centrally between the pairs of brushes.

In many instances the provision of a V-belt is preferable to the use of chain 30, and where so used, pulleys 55 (FIG. 9) are substituted for the sprockets 26, 27. Where the belt is used, it is formed with through holes spaced from each other in a direction longitudinally of the belt through which extend shanks 57 on enlarged heads 58. The heads may be cylindrical and secured against the outer side of the belt 56 by rivetting the opposite ends of the shanks at the inner side of the belt, and a strip 60 extending transversely of the belt may be secured between each head 58 and the belt 56 for supporting the lower run of the belt parallel with and uniformly spaced above the brushes, performing the same function as members 53 in FIG. 2.

Each head 58 may project from the outer side of belt 56 at approximately the same angles as each of the fingers 35 (FIG. 1) project, with respect to the direction of movement of the berries longitudinally of the brushes, so that flexible rubber or plastic tubes 59 secured at one of their ends over the heads will extend at approximately the same angle as the heads. In the structure shown in FIG. 9 the tubes or impellers 59 are disposed in the same vertical plane as the belt. The heads 58 may be formed with annular grooves to assist in frictionally holding the tubes on the heads.

In the modification shown in FIG. 14 the heads on shanks 57 of alternate pairs of shanks may be inclined laterally toward opposite brushes so the impellers or tubes 59a thereon will extend to opposite sides of the vertical plane in which the belt is positioned, with the impellers 59b between said pairs being disposed in said plane. With this arrangement the side strips such as at 36' may be held stationary. In either event, the berries will not tend to stay on the brushes in a position in which the sepals will not be engaged by the bristles before they reach the discharge ends of the brushes.

This structure is more economical to make than the chain and the cylindrical tubes are more flexible and are easy to replace.

The transverse strips 60 correspond to arms 53 and support the lower rim of belt 56.

The structure shown in FIG. 5 is a modification of the form shown in FIG. 1 only in that the rubber rollers 17, 18 are omitted, and the bearings indicated at 61, 62 are not spaced apart, but extend toward each other a sufficient distance to maintain the brushes 2, 3 in the same relation relative to each other as in FIGS. 4, 7 except when spaced by the sepals or by other material drawn between the rollers. The spiral rows of brushes are disgrammatically indicated by single lines. Each bearing 61 is yeldably held agsinst bearing 61 by a spring reacting between bearing 61 and an element 63 rigid on a portion of frame 1, while each bearing 63 is stationarily held on a portion of frame 1.

In my previously mentioned U.S. Pat. No. 2,819,745 a driving arrangement is shown similar to the one above described.

Strawberries, such as designated 65 in FIGS. 10–13, have calyxes or hulls generally designated 66, in which the sepals 67 snugly cover the stem end of each berry similar to a cap. In others the ends of the sepals curl away, and there are combinations of both characteristics. Also the stems may or may not be present. However, the stems are weak and are readily broken off or pulled from the calyx.

The base ends of the sepals are joined together and are tightly connected with an enlargement 68 (FIG. 12) that, in turn, has an extension 70 united therewith and extending into the body of the berry.

In some varieties the sepals are longer than in other varieties and the base portion where they unite covers a greater area in some than in others.

The sepals themselves are relatively thin and fragile, each lacking the tensil strength required to extract the entire calyx by a pull on only one of the sepals in a direction away from the berry. The enlargement 68 in many instances is in a depressed position in stem end of the berry.

The foregoing characteristics have heretofore defeated attempts to mechanically remove the hulls. The diameter of the brushes 2, 3, the resiliency of the bristles, and the degree at which the bristles are in lapping relation, as well as their free lengths, or the distance they project from their supporting shafts, are all important factors in the success of the brushes in removing the hulls and the portions that are held within the body of each berry. These may vary for berries of different kinds or varieties.

In operation, the unhulled strawberries, which may or may not have their stems attached, are preferably fed, single file, onto the rollers 17, 18 at the receiving end of the machine where they will be positioned between the side walls or strips 36.

Normally any foreign particles adhered to the berries and the stems, will readily be removed by rollers 17, 18 and the yieldable mountings will enable them to move apart to pass the particles so removed.

Figure 9:
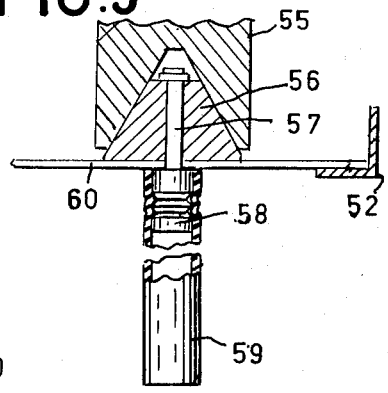
FIG. 9 is a cross-sectional view substantially along line 9—9 of FIG. 8.
Figure 8:
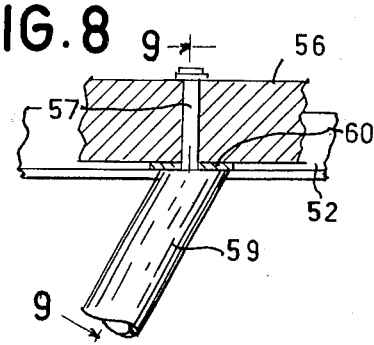
FIG. 8 is an enlarged, fragmentary cross-sectional view of a modification of the structure in FIG. 1, 2 in which a V-belt is used instead of an endless chain.

The oscillating strips 36 and the impellers, whether those shown at 35 (FIG. 1) or at 59 in FIGS. 8, 9, will keep the berries actively moving in different directions as well as longitudinally of the rollers and brushes in a direction toward the discharge end of the machine.

During rotation of the brushes, upon any one of the sepals being picked up by the outer ends of the relatively stiff bristles, it will quickly be drawn between the pair of brushes, and the berry will be pulled against the brushes. Immediately the progressive gathering of the sepals occurs, with the berry rotating about its vertical axis as indicated by lines 73 in FIG. 13; and as soon as all of the sepals are gathered, the bristles commence to enter the berry itself at opposite sides of the gathered sepals as indicated at 69, and the enlargement 68 at the base of the sepals is quickly drawn between the brushes and out of the berry. The pulling force of the brushes on the sepals quickly becomes a pushing force as the brushes engage the opposite edges of the enlargement and move past it, thereby not only removing the sepals and the enlargement, but the extension 70 as well.

In rolling over the brushes under the influence of the impellers 35 the berries not mutilated in anyway, either before or after the sepals have been removed.

The rotation of the berries during the gathering may be the result of the spiral arrangement of the brushes which is the same in both brushes, and in which the uppermost bristles in one row of bristles on one brush move oppositely to the row of bristles in the other row as indicated by the arrows 71, 72. In any event the sepals are progressively gathered and are frictionally pulled by the bristles without stripping them, but which pulling force is sufficient to enable the bristles to quickly eat slightly into the body of the berry as at 69 (FIG. 12) to engage the enlargement 68.

The diameter of each of the brushes is relatively small to reduce the degree of their entry into the strawberries to a minimum, and the stiffness of the bristles and their lengths must be such as to transmit sufficient force to enlargement 68 to pop it out of the berry as soon as the increase in force due to enlargement occurs.

In operation a water spray at 75 or 76 (FIG. 1) or wherever desirable to facilitate keeping the brushes and impellers clean, and any suitable trough or conveyor may be positioned below the rollers and brushes to carry the calyxes away.

A discharge chute 77 at the discharge end of the machine conducts the hulled berries to a conveyor or to any desired location. The feed chute 78 at the feed end merely represents any suitable means for feeding berries in a single file onto the hulling rollers and berries.

The bristles themselves may be generally described as being flexible, resilient, fingers extending radially outwardly of a rotary member relative to the axis of rotation of said member, but they should have the characteristics that enable them to gather the sepals for removal of the calyxes as a whole.

Figure 15:
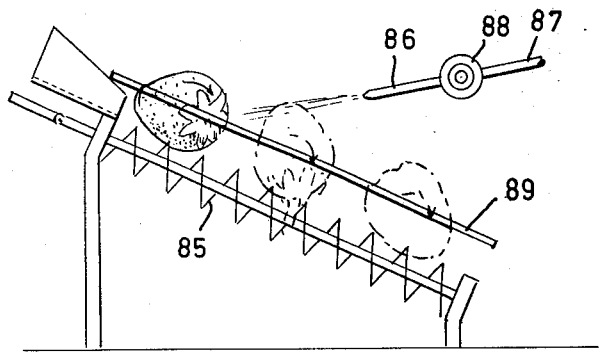
FIG. 15 is a semi-diagrammatic, side-elevational view of a modification of the form heretofore shown.
Figure 16:
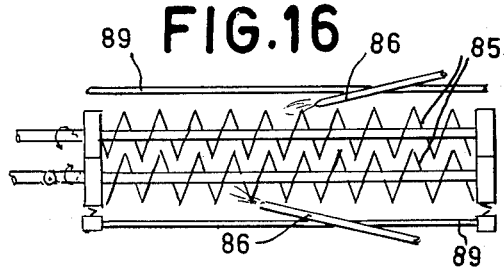
FIG. 16 is a top view of the form as shown in FIG. 15.

In the modification shown in FIGS. 15, 16, the elongated brushes 85 are of the same character as those shown in FIGS. 4–5 and are driven and supported for rotation in the same manner, but they are inclined relative to horizontal at an angle to support the berries for rolling downwardly thereon at a moderate rate of speed. This downward movement is checked by pulsating jets of air from one or more nozzles 86 (FIG. 15) directed oppositely to the direction of movement of the berries and into their downward path at alternate points along opposite sides of said path. The air discharge nozzles 86 along said sides are in air lines 87 connected with a source of air under pressure, and a rotary valve 88 which may have a driving connector with any suitable source of power for effecting intermittent opening and closing of the valve.

Suitable guide means, such as bars 89 along opposite sides of the path of the berries function to prevent any of the berries from escaping during their movement along said path.

The intervals between pulsations and the velocity of the air including the direction of the nozzles may be varied to both check the rate of downward movement of the berries and to move in different directions about their axes while rolling along the brushes to insure at least one of the sepals being caught between the brushes before the berries are discharged from the lower ends of the brushes. Once one of the sepals is caught between the brushes, it will be held until all of the sepals are gathered and the entire calyx is removed.

In some instances it has been found desirable to use a fine water spray instead of air, or in combination with the air to retard the movement of the berries, and to impel them to different changes in their direction of rotation about their axes while moving along the brushes.

Figure 17:
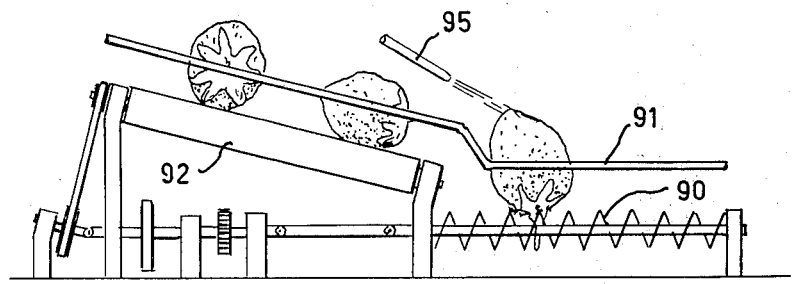
FIG. 17 is a semi-diagrammatic, side-elevational view of a further modification of the forms shown.
Figure 18:
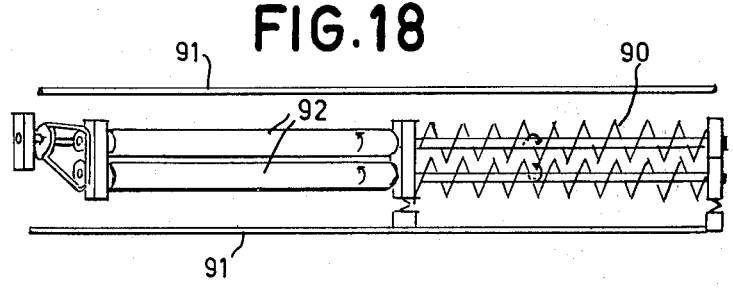
FIG. 18 is a top plan view of the form of device shown in FIG. 17.

In the modification shown in FIGS. 17, 18, the pair of brushes 90 extend generally horizontally, the same as brushes 2, 3 in FIG. 5, and may be rotatably supported and driven in the same manner, and rods 91 along the outer sides of the brushes and over the path of travel of the berries on the rollers, substantially as shown in FIGS. 15, 16 and the same numbers identify parts that are the same as illustrated in FIG. 5.

At the feed end or left hand end of brushes 90 a pair of parallel, slightly spaced rollers 92 are inclined relative to horizontal, with their lower ends adjacent the berry-receiving ends of the brushes. Rollers 92 and the shafts of brushes 90 are equally spaced from a medial vertical plane between the shafts of the brushes and rollers 92.

Rollers 92 are rotated in the same direction hence berries fed onto said rollers will be rotated about an axis extending longitudinally of the rollers. In many varieties of strawberries the berries are slightly elongated longitudinally of the stem axis and the cross-sectional contour of each berry at a right angle to the stem axis is normally more nearly circular than the cross-sectional contour longitudinally of said stem axis. The result is that the berries will be oriented on the rollers 92 to rotate about their stem axes, as they move down the rollers toward the brushes, and when discharged onto the brushes, their calyxes will be in a position to be engaged between the brushes, irrespective of whether the calyx is leading or trailing.

The angle of inclination of the rollers relative to horizontal may be less than an angle on which the berries will roll were the rollers stationary, since the berries will automatically move down the rollers under the influence of gravity when the rollers are rotated.

In the event any of the berries should roll end over end, they will normally be oriented so the calyxes will be in a position upon being discharged onto the brushes for engagement between the latter.

Air jets 95 along the path of movement of the berries on brushes 90 will impel the hulled and unhulled berries toward the discharge end of the brushes.

While the fingers 35 and 59a and 59b (FIG. 14) may be said to orient the berries by moving them on the brushes to a position in which one or more of the sepals will be engaged between the brushes, the rollers 92 will function to orient them before they reach the brushes.

In all forms of the invention herein described, a succession of yieldable, resilient, flexible fingers are supported for movement around a pair of spaced axes disposed in side-by-side relation and with said fingers moving in the same direction at the adjacent sides of said axes and away from the berries supported for movement in a path extending longitudinally of said axes at one side of said pair of axes in engagement with said fingers, and said berries are so supported for said movement. The outer ends of said fingers, in all forms of said invention, are in lapping relation at the adjacent sides of said axes, and in all forms the calyxes are gathered between the lapping ends and are yieldably gripped and pulled in a direction away from said berries, and are removed from the berries, including the enlargements at their inner ends. Also in all forms the bodies of the berries are not effected, with the exception of the slight portions at 69 (FIG. 12) at two opposite sides of the stem enlargement, which is negligible compared with the non-uniform gouging that occurs in the conventional hand stemming method in which portions are removed by fingernail elements supported on the thumbs of the operators.

I claim:

1. The method of removing the calyx from the body of a berry having a stem end and a substantially central axis extending therethrough and which calyx includes a stem enlargement on said axis within said body at said stem end and a plurality of sepals connected with said enlargement extending radially outwardly therefrom and from said axis across the outer surface of said stem end adjacent said enlargement, comprising the steps of:
 a. gathering said sepals together in approximately side by side relation extending in a direction outwardly of said stem end generally axially of said body wherein said sepals are gathered with oppositely rotating brushes containing bristles being sufficiently stiff and resilient to pull the sepals without tearing them; then
 b. applying a pulling force with said bristles to said calyx in said last mentioned direction adjacent the connection between said calyx and said enlargement and restraining said body against free movement in said direction and with continued rotation of said brushes advancing said pulling force into said body and across said enlargement to the side thereof opposite said calyx, and then applying said force against said opposite side in the direction of said calyx thereby converting said pulling force to a pushing force applied to said enlargement directed outwardly of said stem end axially of said body, and then
 c. ejecting said enlargement and said calyx from said body under the influence of said pushing force.

2. The method as defined in claim 1, in which
 d. said sepals are progressively gathered to said side by side relation and are frictionally gripped before said pushing force is applied to said enlargement.

3. In the method as defined in claim 1:
 d. said pulling force being transmitted to said sepals through yieldable pressure applied to opposite lateral sides of said sepals; and
 e. said pushing force being transmitted to said enlargement against the side facing axially into said body and in a direction outwardly of said body.

4. The method of removing the calyx from the body of a strawberry having a substantially central axis and which calyx includes a stem-enlargement on said axis securely held on said body at one end thereof and sepals around and connected with said enlargement and projecting radially from said axis, comprising the steps of:
 a. progressively gathering said sepals together in substantially side-by-side relation and extending in one direction away from said body wherein said sepals are gathered with oppositely rotating brushes containing bristles being sufficiently stiff and resilient to pull the sepals without tearing them; then
 b. restraining said body against free movement in said direction;
 c. applying a pulling force with said bristles to said sepals at a point adjacent said enlargement which force is insufficient to pull said sepals and enlargement from said body and then with continued rotation of said brushes advancing said pulling force into said body and across said enlargement to the side thereof opposite said sepals thereby converting said pulling force to a pushing force applied to said enlargement generally in a direction outwardly of said body, and then ejecting said enlargement together with the sepals attached thereto under the influence of said pushing force.

5. The method of removing the calyx from the body of a berry having a substantially central axis, and which berry includes a stem-enlargement on said axis within said body with the sepals of said calyx connected therewith and projecting radially therefrom, comprising the steps of;
 a. frictionally gripping at least one of the sepals of said calyx between stiff and resilient bristles of oppositely rotating brushes said bristles providing a plurality of separate yieldable gripping surfaces supported for successive movement to and past a fixed calyx gripping location in a direction away from said berry for pulling the ungripped sepals to said location for gripping between said surfaces; then
 b. frictionally gripping said ungripped sepals without tearing with said bristles at said location for pulling said body to said surfaces; and finally
 c. pulling by continued rotation of said brushes said berry against said surfaces at said location until said surfaces enter said body and engage said enlargement at the side thereof opposite said calyx thereby converting said pulling to a pushing force applied to said enlargement; and then
 d. ejecting said enlargement and calyx from said berry under the influence of the force applied by said surfaces to said enlargement.

* * * * *